(12) United States Patent
Rippel et al.

(10) Patent No.: US 11,315,011 B2
(45) Date of Patent: Apr. 26, 2022

(54) USING GENERATIVE ADVERSARIAL NETWORKS IN COMPRESSION

(71) Applicant: WaveOne Inc., Mountain View, CA (US)

(72) Inventors: Oren Rippel, Mountain View, CA (US); Lubomir Bourdev, Mountain View, CA (US); Carissa Lew, San Jose, CA (US); Sanjay Nair, Fremont, CA (US)

(73) Assignee: WaveOne Inc., Mountain View, CA (US)

( * ) Notice: Subject to any disclaimer, the term of this patent is extended or adjusted under 35 U.S.C. 154(b) by 1144 days.

(21) Appl. No.: 15/844,449

(22) Filed: Dec. 15, 2017

(65) Prior Publication Data

US 2018/0174052 A1     Jun. 21, 2018

Related U.S. Application Data

(60) Provisional application No. 62/458,749, filed on Feb. 14, 2017, provisional application No. 62/434,602, (Continued)

(51) Int. Cl.
*G06N 3/08* (2006.01)
*G06N 3/04* (2006.01)
(Continued)

(52) U.S. Cl.
CPC ............... *G06N 3/08* (2013.01); *G06N 3/04* (2013.01); *G06N 20/00* (2019.01);
(Continued)

(58) Field of Classification Search
CPC ............ G06N 3/08; G06N 3/04; G06N 3/084
See application file for complete search history.

(56) References Cited

U.S. PATENT DOCUMENTS

2017/0357029 A1* 12/2017 Lakshmanan ........ G06Q 50/265
2018/0107926 A1*  4/2018 Choi ...................... G06N 3/063
(Continued)

OTHER PUBLICATIONS

Pascal Vincent, "Stacked Denoising Autoencoders: Learning Useful Representations in a Deep Network with a Local Denoising Criterion", Journal of Machine Learning Research, 2010 (Year: 2010).*
(Continued)

*Primary Examiner* — Ann J Lo
*Assistant Examiner* — Van C Mang
(74) *Attorney, Agent, or Firm* — Fenwick & West LLP

(57) ABSTRACT

The compression system trains a machine-learned encoder and decoder through an autoencoder architecture. The encoder can be deployed by a sender system to encode content for transmission to a receiver system, and the decoder can be deployed by the receiver system to decode the encoded content and reconstruct the original content. The encoder is coupled to receive content and output a tensor as a compact representation of the content. The content may be, for example, images, videos, or text. The decoder is coupled to receive a tensor representing content and output a reconstructed version of the content. The compression system trains the autoencoder with a discriminator to reduce compression artifacts in the reconstructed content. The discriminator is coupled to receive one or more input content, and output a discrimination prediction that discriminates whether the input content is the original or reconstructed version of the content.

19 Claims, 7 Drawing Sheets

Related U.S. Application Data filed on Dec. 15, 2016, provisional application No. 62/434,600, filed on Dec. 15, 2016, provisional application No. 62/434,603, filed on Dec. 15, 2016.

(51) Int. Cl.

| | | |
|---|---|---|
| G06N 20/00 | (2019.01) | |
| G06K 9/62 | (2006.01) | |
| G06K 9/42 | (2006.01) | |
| G06K 9/46 | (2006.01) | |
| H04N 19/12 | (2014.01) | |
| H04N 19/16 | (2014.01) | |
| H04N 19/17 | (2014.01) | |
| H04N 19/19 | (2014.01) | |
| H04N 19/91 | (2014.01) | |
| H04N 19/44 | (2014.01) | |
| G06K 9/66 | (2006.01) | |
| G06T 5/00 | (2006.01) | |
| H04N 19/13 | (2014.01) | |
| H04N 19/14 | (2014.01) | |
| H04N 19/18 | (2014.01) | |
| H04N 19/48 | (2014.01) | |
| H04N 19/15 | (2014.01) | |
| H04N 19/33 | (2014.01) | |
| G06K 9/00 | (2006.01) | |
| H04N 19/126 | (2014.01) | |
| H04N 19/167 | (2014.01) | |
| H04N 19/172 | (2014.01) | |
| H04N 19/196 | (2014.01) | |
| H04N 19/149 | (2014.01) | |
| H04N 19/154 | (2014.01) | |

(52) U.S. Cl.
CPC ..... *G06K 9/00288* (2013.01); *G06K 9/00744* (2013.01); *G06K 9/00771* (2013.01); *G06K 9/4619* (2013.01); *G06K 9/4628* (2013.01); *G06K 9/6212* (2013.01); *G06K 9/6232* (2013.01); *G06K 9/6256* (2013.01); *G06K 9/6263* (2013.01); *G06K 9/6274* (2013.01); *G06K 9/66* (2013.01); *G06K 2209/01* (2013.01); *G06N 3/0454* (2013.01); *G06N 3/084* (2013.01); *G06T 5/002* (2013.01); *H04N 19/126* (2014.11); *H04N 19/13* (2014.11); *H04N 19/149* (2014.11); *H04N 19/154* (2014.11); *H04N 19/167* (2014.11); *H04N 19/172* (2014.11); *H04N 19/18* (2014.11); *H04N 19/197* (2014.11); *H04N 19/33* (2014.11); *H04N 19/44* (2014.11); *H04N 19/48* (2014.11); *H04N 19/91* (2014.11)

(56) References Cited

U.S. PATENT DOCUMENTS

2019/0122120 A1* 4/2019 Wu .................. G06N 3/0472
2019/0171936 A1   6/2019 Karras et al.

OTHER PUBLICATIONS

Dong Nie, "Medical Image Synthesis with Context-Aware Generative Adversarial Networks", 2016 (Year: 2016).*
Anders Larsen, Autoencoding beyond pixels using a learned similarity metric 2016 (Year: 2016).*
Yarsolav Ganin, "Domain-Adversarial Training of Neural Networks", 2016 (Year: 2016).*
Pavel Svoboda, "Compression Artifacts Removal Using Convolutional Neural Networks", 2016 (Year: 2016).*
Karol Gregor, "Towards Conceptual Compression", 2016 (Year: 2016).*
Antonini, M. et al., "Image Coding Using Wavelet Transform," IEEE Transactions on Image Processing, Apr. 1992, pp. 205-220, vol. 1, No. 2.
Balle, J. et al., "End-to-End Optimized Image Compression," ICLR 2017, Mar. 3, 2017, pp. 1-27.
Balle, J. et al., "Variational Image Compression with a Scale Hyperprior," ICLR 2018, May 1, 2018, pp. 1-23.
Bottou, L. et al., "High Quality Document Image Compression with "DjVu"," Journal of Electronic Imaging, Jul. 1998, pp. 410-4258, vol. 7, No. 3.
Dang-Nguyen, D.-T. et al., "RAISE: A Raw Images Dataset for Digital Image Forensics," In Proceedings of the 6th ACM Multimedia Systems Conference, ACM, 2015, MMSys'15, Mar. 18-20, 2015, pp. 219-224.
Denton, E. L. et al., "Deep Generative Image Models Using a Laplacian Pyramid of Adversarial Networks," In Advances in Neural Information Processing Systems, Jun. 18, 2015, pp. 1486-1494.
Goodfellow, I. et al., "Generative Adversarial Nets." In Advances in Neural Information Processing Systems, 2014, pp. 2672-2680.
Haffner, P. et al., "DjVu: Analyzing and Compressing Scanned Documents for Internet Distribution," ICDAR 1999, 1999, pp. 1-4.
Hinton, G.E. et al., "Reducing the Dimensionality of Data with Neural Networks," Science, Jul. 28, 2006, pp. 504-507, vol. 313.
Isola, P. et al., "Image-to-Image Translation with Conditional Adversarial Networks," Nov. 22, 2017, pp. 1-17.
Kingma, D. et al., "ADAM: A Method for Stochastic Optimization," ICLR 2015, Jan. 30, 2017, pp. 1-15.
Ledig, C. et al., "Photo-Realistic Single Image Super-Resolution Using a Generative Adversarial Network," Nov. 21, 2016, pp. 1-19.
Mallat, S. G. "A Theory for Multiresolution Signal Decomposition: The Wavelet Representation," IEEE Transactions on Pattern Analysis and Machine Intelligence, Jul. 1989, pp. 674-693, vol. 11, No. 7.
Mathieu, M. et al., "Deep Multi-Scale Video Prediction Beyond Mean Square Error," ICLR 2016, Feb. 26, 2016, pp. 1-14.
Radford, A. et al., "Unsupervised Representation Learning with Deep Convolutional Generative Adversarial Networks," ICLR 2016, Jan. 7, 2016, pp. 1-16.
Rippel, O. et al., "Learning Ordered Representations with Nested Dropout," In International Conference on Machine Learning, Feb. 5, 2014, 11 pages.
Salimans, T. et al., "Improved Techniques for Training GANs," 30th Conference on Neural Information Processing Systems (NIPS 2016), Barcelona, Spain, In Advances in Neural Information Processing Systems, 2016, pp. 2226-2234.
Santurkar, S. et al., "Generative Compression," Jun. 4, 2017, pp. 1-10.
Shi,W. et al., "Real-Time Single Image and Video Super-Resolution Using an Efficient Sub-Pixel Convolutional Neural Network," the IEEE Conference on Computer Vision and Pattern Recognition (CVPR), 2016, pp. 1874-1883.
Theis, L. et al., "Lossy Image Compression with Compressive Autoencoders," ICLR 2017, Mar. 1, 2017, pp. 1-19.
Thomee, B. et al., "YFCC100M: The New Data in Multimedia Research," Communications of the ACM, Feb. 2016, pp. 64-73, vol. 59, No. 2.
Toderici, G. et al., "Full Resolution Image Compression with Recurrent Neural Networks," ICLR 2017, Jul. 7, 2017, pp. 1-9.
Toderici, G. et al., "Variable Rate Image Compression with Recurrent Neural Networks," ICLR 2016, pp. 1-12.
Wallace, G.K., "The JPEG Still Picture Compression Standard," IEEE Transactions on Consumer Electronics, Feb. 1992, pp. xviii-xxxiv, vol. 38, No. 1.
Wang, Z. et al., "Image Quality Assessment: from Error Visibility to Structural Similarity," IEEE Transactions on Image Processing, Apr. 2004, pp. 600-612, vol. 13, No. 4.
Wang, Z. et al., "Multiscale Structural Similarity for Image Quality Assessment," In Conference Record of the Thirty-Seventh Asilomar Conference on Signals, Systems and Computers, 2004., IEEE, Nov. 9-12, 2003, pp. 1398-1402, vol. 2.

(56) References Cited

OTHER PUBLICATIONS

Wikipedia: Structural Similarity, Wikipedia.org, Last Edited Mar. 22, 2018, 7 pages, [Online] [Retrieved on Apr. 10, 2018] Retrieved from the Internet<URL:https://en.wikipedia.org/wiki/Structural_similarity>.

* cited by examiner

USING GENERATIVE ADVERSARIAL NETWORKS IN COMPRESSION

CROSS REFERENCE TO RELATED APPLICATIONS

This application claims the benefit of provisional U.S. Application No. 62/434,600, filed on Dec. 15, 2016, provisional U.S. Application No. 62/434,602, filed on Dec. 15, 2016, provisional U.S. Application No. 62/434,603, filed on Dec. 15, 2016, and provisional U.S. Application No. 62/458,749, filed on Feb. 14, 2017. Each aforementioned provisional application is incorporated herein by reference in its entirety.

BACKGROUND

This invention generally relates to encoding and decoding content, and more specifically to encoding and decoding content to reduce compression artifacts.

Various online systems transmit information to and from one another over a network. The information may be, for example, content such as an image or video, or a string of text such as an e-mail or word document. Typically, the sender encodes the information into a compressed code such that the compressed code can be efficiently transmitted to the receiver. The receiver can then decode the compressed code to reconstruct the original information. For example, responsive to a request to download a particular image from a client device, an image sharing website may encode the image and transmit the compressed code to the client device. The sender may also compress the information into different levels according to the available bandwidth at the sender or receiver.

Often times, the content reconstructed from the compressed code may contain compression artifacts that are distortions from the corresponding region of the original content caused by the encoding process. Specifically, the encoding process may discard at least a part of the information in the original content such that the compressed code can be transmitted within the bandwidth limitations or stored within storage limitations of a device. Compression artifacts may be included in the reconstructed content if the compressed code does not contain enough information to reconstruct the original content, and may be noticeable by viewers of the reconstructed content. Compression artifacts may include, for example, blockiness, ringing, countouring, posterizing, and the like.

SUMMARY

The compression system trains a machine-learned encoder and decoder through an autoencoder architecture. The encoder can be deployed by a sender system to encode content for transmission to a receiver system, and the decoder can be deployed by the receiver system to decode the encoded content and reconstruct the original content. The encoder is coupled to receive content and output a tensor as a compact representation of the content. The content may be, for example, images, videos, or text. The decoder is coupled to receive a tensor representing content and output a reconstructed version of the content.

In one embodiment, the compression system trains the autoencoder with a discriminator to reduce compression artifacts in the reconstructed content. The discriminator is coupled to receive one or more input content, and output a discrimination prediction that discriminates whether the input content is the original or reconstructed version of the content. Specifically, the original version and the reconstructed version may be distinguishable from one another in that the reconstructed content may include characteristics, such as compression artifacts, that arise during the encoding process. Since the original content does not include such characteristics, the discriminator can learn to discriminate between the original and reconstructed version by identifying such differences between the two.

The compression system trains the discriminator to output predictions that correctly discriminate between original and reconstructed content generated by the autoencoder. The compression system trains the autoencoder to generate reconstructed content that causes the discriminator to output incorrect predictions. By repeatedly training the autoencoder to compete with the discriminator, the compression system can train an encoder and decoder to continuously tune the reconstructed content to "fool" the discriminator by, for example, reducing the differences between the original and reconstructed content, such as compression artifacts, that arise through the encoding process. In this manner, the reconstructed content can appear more realistic and natural like the original version, even though some information has been discarded from the original version during the encoding process.

When the training process for the autoencoder is completed, the compression system provides the sender system with encoding components including the machine-learned encoder and an entropy coder for compressing the tensors into compressed code that can be transmitted to the receiver system. The entropy coder is associated with an entropy decoder that performs an inverse operation of the entropy coder. The compression system also provides the receiver system with decoding components including the entropy decoder for synthesizing tensors from compressed code, and the machine-learned decoder.

The compression system trains the autoencoder and the discriminator using a set of training content. The discriminator is coupled to receive one or more input content and output a discrimination prediction indicating whether the input content is the original or reconstructed version of the content. The compression system trains the discriminator to reduce a discriminator loss. The discriminator loss indicates the cost of generating an incorrect prediction by the discriminator responsive to receiving the training content and the reconstructed content generated by the autoencoder. In this manner, the parameters of the discriminator are configured to discriminate between training and reconstructed versions of content based on the differences between the two versions that arise during the encoding process.

In one embodiment, the discriminator is coupled to receive individual samples of content, and output a discrimination prediction that indicates a likelihood the input content is the original content or the reconstructed version of the content. For example, the discriminator may receive an individual image and output a discrimination prediction indicating a likelihood that the image is the reconstructed image. In another embodiment, the discriminator is coupled to receive a pair of input content including the original and reconstructed versions of the content, and output a discrimination prediction that indicates which of the content is the original version. For example, the discriminator may receive an ordered pair of a first image and a second image, and output a discrimination prediction indicating that the first image is the original image. By including both the original content and the corresponding reconstructed content simultaneously as an input pair, the discriminator can be trained to distinguish between the two versions directly based on differences arising from the pair of input content.

The autoencoder is coupled to receive content and output a reconstructed version of the content. Specifically, the autoencoder receives content, generates a tensor for the content, and synthesizes the reconstructed content from the tensor. The tensor is a compact representation of the content with respect to the structural features of the content. The tensor may include a set of feature maps, in which the feature map at each channel depth of the tensor indicates the presence of a corresponding structural feature in the content.

The compression system trains the autoencoder based on an autoencoder loss function. In one embodiment, the autoencoder loss function may be given by the combination of the reconstruction loss and the negative of the discriminator loss. The reconstruction loss represents dissimilarity between the training content and the reconstructed content generated by applying the autoencoder to the training content. Specifically, the compression system trains the autoencoder to reduce a reconstruction loss, while increasing the discriminator loss. By training the encoder and the decoder to reduce the reconstruction loss, the parameters of the autoencoder are configured to generate reconstructed content that closely resembles the structure of the original content. By training the autoencoder to increase the discriminator loss, the parameters are configured to reduce differences between the original and reconstructed content that arise during the encoding process and are distinguishable by the discriminator.

The compression system trains the autoencoder and the discriminator by repeatedly iterating between a forward pass step and a backpropagation step. During the forward pass step, the compression system generates reconstructed content by applying the autoencoder with an estimated set of parameters to the training content, and generates discrimination predictions by applying the discriminator with an estimated set of parameters to the training content and the reconstructed content.

During the backpropagation step, the compression system updates the parameters of the discriminator and the autoencoder. Specifically, the compression system may determine the discriminator loss based on the discrimination predictions, and repeatedly update the parameters of the discriminator by backpropagating error terms obtained from the discriminator loss. The compression system may also determine the autoencoder loss including the reconstruction loss and the negative of the discriminator loss, and repeatedly update the parameters of the autoencoder by backpropagating error terms obtained from the autoencoder loss.

In one embodiment, the compression system performs the training process by alternately switching back and forth between updating the parameters of the autoencoder and updating the parameters of the discriminator. Specifically, the compression system performs one or more iterations of the forward and backpropagation steps for the autoencoder. During the backpropagation step, the compression system determines the autoencoder loss and repeatedly updates the parameters of the autoencoder while the parameters of the discriminator are fixed. After performing the iterations for the autoencoder, the compression system performs one or more iterations of the forward and backpropagation steps for the discriminator. During the backpropagation step, the compression system determines the discriminator loss and repeatedly updates the parameters of the discriminator while the parameters of the autoencoder are fixed.

Figure 1:
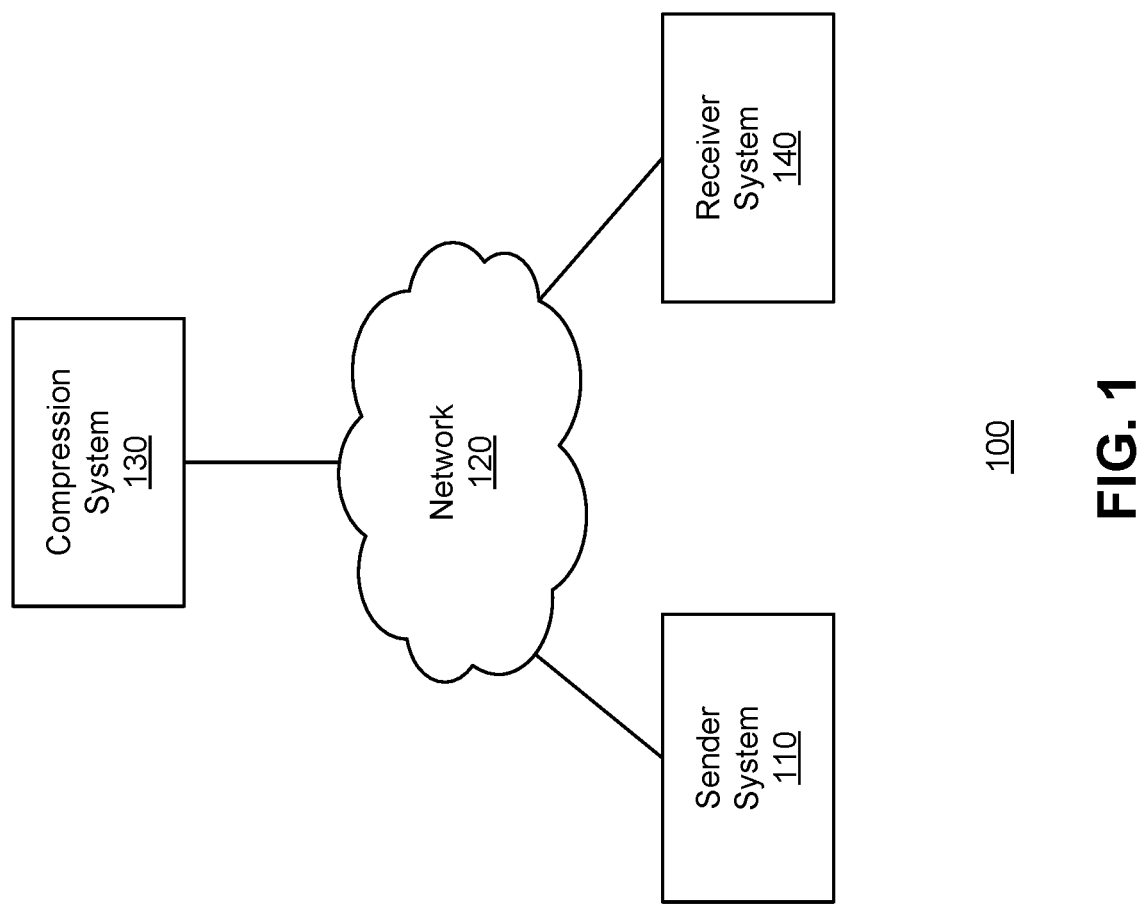
FIG. 1 is a block diagram of a system environment including a compression system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1 is a block diagram of a system environment 100 including a compression system 130, in accordance with an embodiment. The system environment 100 shown in FIG. 1 comprises a compression system 130, a sender system 110, a receiver system 140, and a network 120. In alternative configurations, different and/or additional components may be included in the system environment 100.

The compression system 130 trains a machine-learned encoder and decoder through an autoencoder architecture. The encoder can be deployed by a sender system 110 to encode content for transmission to a receiver system 140, and the decoder can be deployed by the receiver system 140 to decode the encoded content and reconstruct the original content. The encoder is coupled to receive content and output a tensor as a compact representation of the content. The content may be, for example, images, videos, or text. The decoder is coupled to receive a tensor representing content and output a reconstructed version of the content.

In one embodiment, the compression system 130 trains the autoencoder with a discriminator to reduce compression artifacts in the reconstructed content. The discriminator is coupled to receive one or more input content, and output a discrimination prediction that discriminates whether the input content is the original or reconstructed version of the content. Specifically, the original version and the reconstructed version may be distinguishable from one another in that the reconstructed content may include characteristics, such as compression artifacts, that arise during the encoding process. Since the original content does not include such characteristics, the discriminator can learn to discriminate between the original and reconstructed version by identifying such differences between the two.

The compression system 130 trains the discriminator to output predictions that correctly discriminate between original and reconstructed content generated by the autoencoder. The compression system 130 trains the autoencoder to generate reconstructed content that causes the discriminator to output incorrect predictions. By repeatedly training the autoencoder to compete with the discriminator, the compression system 130 can train an encoder and decoder to continuously tune the reconstructed content to "fool" the discriminator by, for example, reducing the differences between the original and reconstructed content, such as compression artifacts, that arise through the encoding process. In this manner, the reconstructed content can appear more realistic and natural like the original version, even though some information has been discarded from the original version during the encoding process.

When the training process for the autoencoder is completed, the compression system 130 provides the sender system 110 with encoding components including the machine-learned encoder and an entropy coder for compressing the tensors into compressed code that can be transmitted to the receiver system 140. The entropy coder is associated with an entropy decoder that performs an inverse operation of the entropy coder. The discriminator may be trained with the autoencoder during the training process, but is not required in the encoding components provided to the sender system 110. The compression system 130 also provides the receiver system 140 with decoding components including the entropy decoder for synthesizing tensors from compressed code, and the machine-learned decoder.

The sender system 110 is an online system that transmits encoded content to one or more receiver systems 140. For example, the sender system 110 may be an image or video sharing website that transmits images and videos responsive to receiving requests from one or more receiver systems 140. The sender system 110 receives encoding components from the compression system 130 including the machine-learned encoder, and uses the encoding components to encode content for transmission to the receiver system 140.

The receiver system 140 is an online system that receives compressed code from the sender system 110, and reconstructs the content using decoding components received from the compression system 130. For example, the receiver system 140 may be a client device for a user of an image sharing website that requests to download one or more images of the website. The receiver system 140 may receive the compressed code along with the decoding components, and use the decoding components to generate a reconstructed version of the content.

Figure 2:
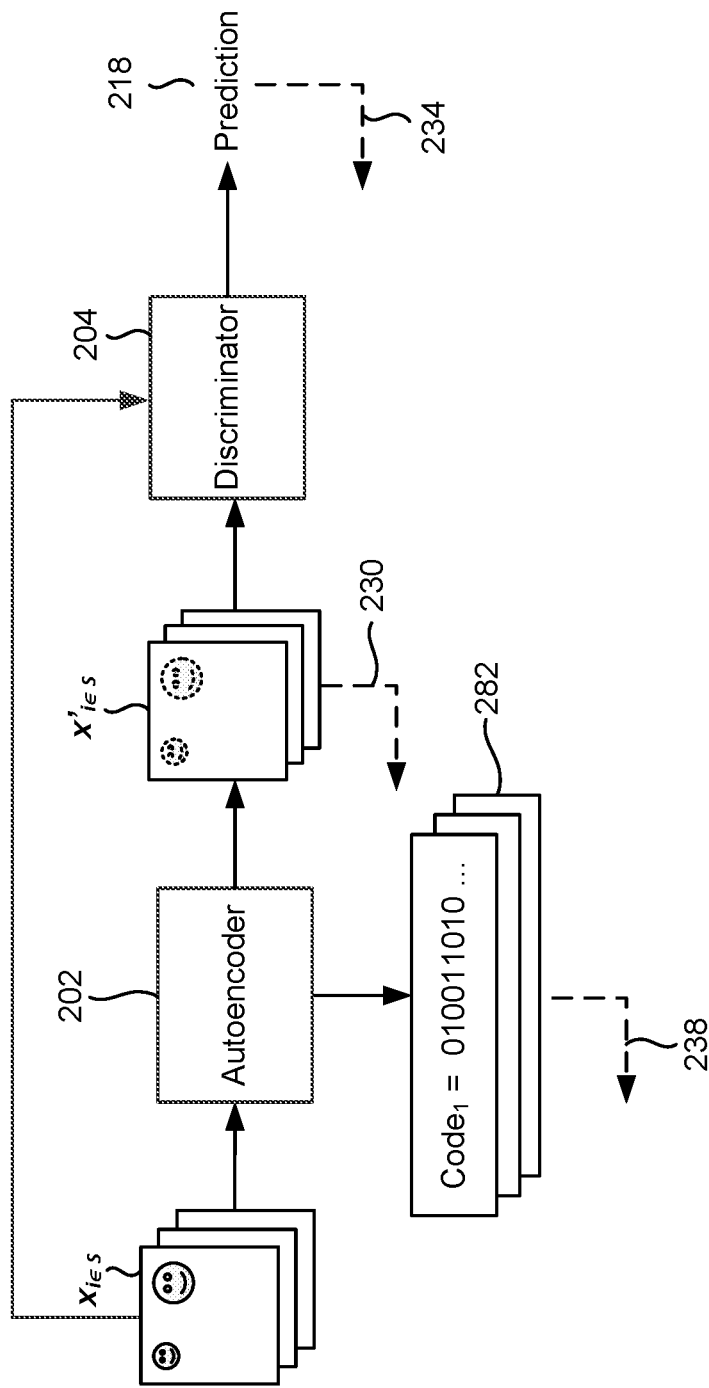
FIG. 2 illustrates a general process for training an autoencoder, in accordance with an embodiment.

FIG. 2 illustrates a general process for training an autoencoder 202, in accordance with an embodiment. The output of the autoencoder 202 is coupled to a discriminator 204.

Specifically, the autoencoder 202 is coupled to receive content and output a reconstructed version of the content. The discriminator 204 is coupled to receive the original content and the reconstructed content generated by the autoencoder 202 and output a discrimination prediction.

The compression system 130 trains the autoencoder 202 and the discriminator 204 using a set of training content $x_{i \in S}$ from a training set S. The discriminator 204 is coupled to receive one or more input content and output a discrimination prediction indicating whether the input content is the original or reconstructed version of the content. The compression system 130 trains the discriminator 204 to reduce a discriminator loss. The discriminator loss indicates the cost of generating an incorrect prediction by the discriminator responsive to receiving the training content and the reconstructed content generated by the autoencoder 202. In this manner, the parameters of the discriminator 204 are configured to discriminate between training and reconstructed versions of content based on the differences between the two versions that arise during the encoding process.

In one embodiment, the discriminator 204 is coupled to receive individual samples of content, and output a discrimination prediction that indicates a likelihood the input content is the original content or the reconstructed version of the content. For example, the discriminator 204 may receive an individual image, and output a discrimination prediction indicating a likelihood that the image is the reconstructed image. In another embodiment, the discriminator 204 is coupled to receive a pair of input content including the original and reconstructed versions of the content, and output a discrimination prediction that indicates which of the content is the original version. For example, the discriminator 204 may receive an ordered pair of a first image and a second image, and output a discrimination prediction indicating that the first image is the original image. By including both the original content and the corresponding reconstructed content simultaneously as an input pair, the discriminator 204 can be trained to distinguish between the two versions directly based on differences arising from the pair of input content.

The autoencoder 202 is coupled to receive content and output a reconstructed version of the content. Specifically, the autoencoder 202 receives content, generates a tensor for the content, and synthesizes the reconstructed content from the tensor. The tensor is a compact representation of the content with respect to the structural features of the content. The tensor may include a set of feature maps, in which the feature map at each channel depth of the tensor indicates the presence of a corresponding structural feature in the content.

The compression system 130 trains the autoencoder 202 based on an autoencoder loss function. In one embodiment, the autoencoder loss function may be given by the combination of the reconstruction loss and the negative of the discriminator loss. The reconstruction loss represents dissimilarity between the training content and the reconstructed content generated by applying the autoencoder 202 to the training content. Specifically, the compression system 130 trains the autoencoder 202 to reduce a reconstruction loss, while increasing the discriminator loss. By training the encoder 250 and the decoder 260 to reduce the reconstruction loss, the parameters of the autoencoder 202 are configured to generate reconstructed content that closely resembles the structure of the original content. By training the autoencoder 202 to increase the discriminator loss, the parameters are configured to reduce differences between the original and reconstructed content that arise during the encoding process and are distinguishable by the discriminator.

The compression system 130 trains the autoencoder 202 and the discriminator 204 by repeatedly iterating between a forward pass step and a backpropagation step. During the forward pass step, the compression system 130 generates reconstructed content $x'_{i \in S}$ by applying the autoencoder 202 with an estimated set of parameters to the training content $x_{i \in S}$, and generates discrimination predictions 218 by applying the discriminator 204 with an estimated set of parameters to the training content $x_{i \in S}$ and the reconstructed content $x'_{i \in S}$.

During the backpropagation step, the compression system 130 updates the parameters of the discriminator 204 and the autoencoder 202. Specifically, the compression system 130 may determine the discriminator loss 234 based on the discrimination predictions 218, and repeatedly update the parameters of the discriminator 204 by backpropagating error terms obtained from the discriminator loss 234. The compression system 130 may also determine the autoencoder loss including the reconstruction loss 230 and the negative of the discriminator loss 234, and repeatedly update the parameters of the autoencoder 202 by backpropagating error terms obtained from the autoencoder loss.

In one embodiment, the compression system 130 performs the training process by alternately switching back and forth between updating the parameters of the autoencoder 202 and updating the parameters of the discriminator 204. Specifically, the compression system 130 performs one or more iterations of the forward and backpropagation steps for the autoencoder 202. During the backpropagation step, the compression system 130 determines the autoencoder loss and repeatedly updates the parameters of the autoencoder 202 while the parameters of the discriminator 204 are fixed. After performing the iterations for the autoencoder 202, the compression system 130 performs one or more iterations of the forward and backpropagation steps for the discriminator 204. During the backpropagation step, the compression system 130 determines the discriminator loss 234 and repeatedly updates the parameters of the discriminator 204 while the parameters of the autoencoder 202 are fixed.

In one embodiment, the compression system 130 may additionally include a codelength regularization loss in the autoencoder loss function. The codelength regularization loss is determined based on the magnitude of the tensor values output by the autoencoder 202, and is repeatedly adjusted by the compression system 130 such that the length of the compressed code generated from the tensor achieves a desired target length. During the backpropagation step for the autoencoder 202, the compression system 130 determines the autoencoder loss function including the codelength regularization loss 238 along with the reconstruction loss 230 and the discriminator loss 234. The codelength regularization loss 238 is determined based on the magnitude of the tensor values and the length of the compressed codes 282 that are generated by applying the entropy coder to the tensors.

By including the codelength regularization loss in the loss function, the encoder of the autoencoder 202 can exploit the structure of the content to generate a tensor that reduces the length of the compressed code when possible while achieving reasonable reconstruction fidelity. For example, content with a simple structure may be encoded with a shorter code length than content with a complex structure. Including the codelength regularization loss allows the encoder of the autoencoder 202 to generate a tensor with shorter code length when possible to exploit content with simple structures.

Training Process of Autoencoder and Discriminator

Figure 3:
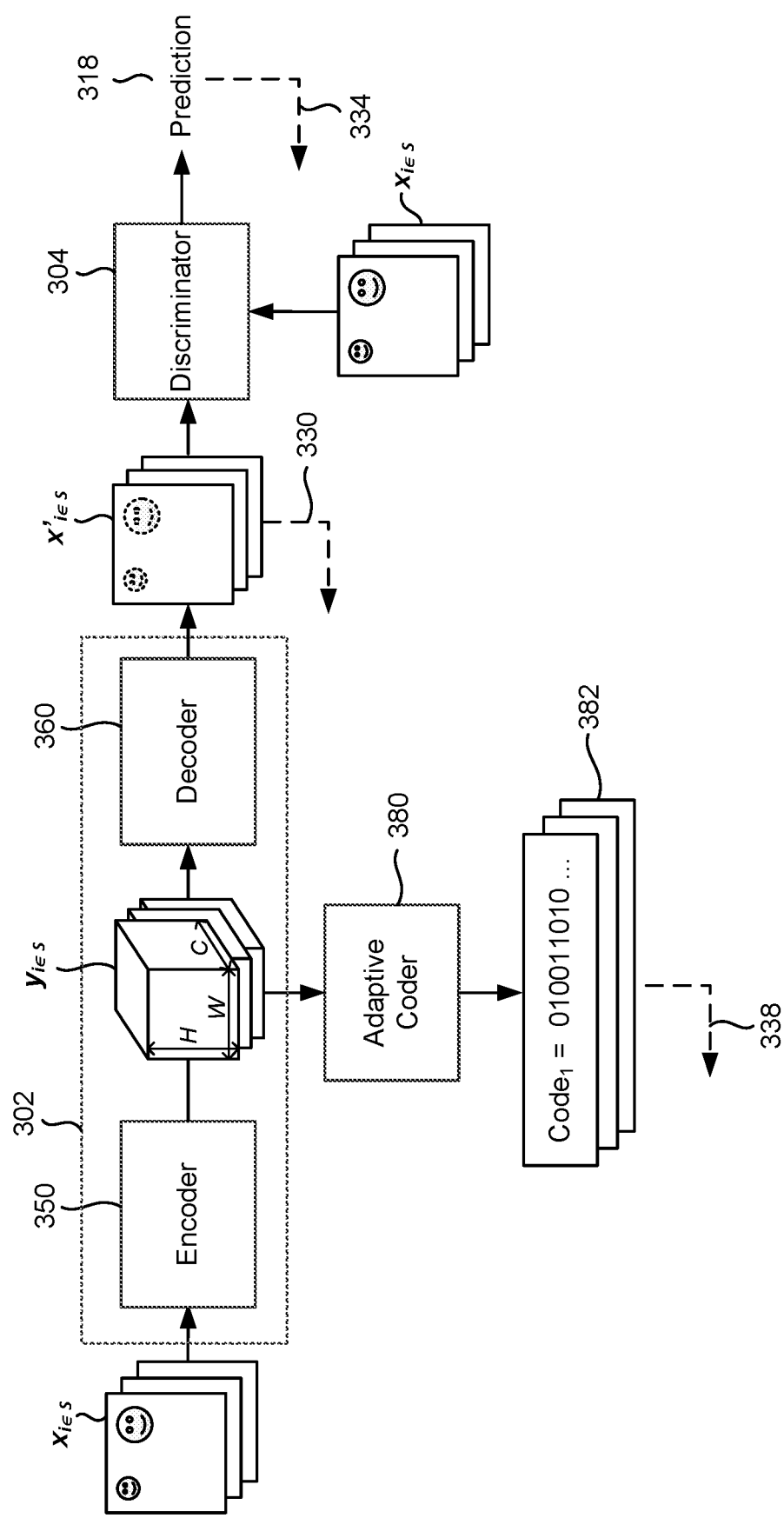
FIG. 3 illustrates a detailed process of training the autoencoder with the discriminator, in accordance with an embodiment.

FIG. 3 illustrates a detailed process of training the autoencoder 302 with the discriminator 304, in accordance with an embodiment. The autoencoder 302 includes an encoder 350 and a decoder 360 coupled to the encoder 350. The discriminator 304 is coupled to receive reconstructed content output by the autoencoder 350 and output a discrimination prediction.

The encoder 350 is coupled to receive content and output a tensor for the content. In one embodiment, the encoder 350 includes a neural network model defined by a series of parameterized functions. Specifically, a tensor y for content x may be generated by:

$$y = f_g(x; \theta_g) \in \mathbb{R}^{C \times H \times W}$$

where $f_g(\cdot)$ denotes the functions of the encoder 350 associated with a set of parameters $\theta_g$. The tensor y has dimensions of width W, height H, and depth C, in which $y_{chw}$ denotes an element of the tensor at channel depth c=1, 2, ..., C, height h=1, 2, ..., H, and width w=1, 2, ..., W. The tensor y is a compact representation of the content with respect to the structural features of the content. Specifically, each W×H feature map of the tensor y at a particular channel depth c may be associated with the presence of a corresponding structural feature in the content x. During the forward pass step, the set of tensors $y_{i \in S}$ may be generated by applying the encoder 350 to the set of training content $x_{i \in S}$. In the example shown in FIG. 3, each tensor $y_i$ is shown to have dimensionality C×H×W.

Although not shown in FIG. 3, in one embodiment, the encoder 350 may optionally perform one or more additional operations on the tensor y. In one instance, the encoder 350 performs a quantization operation such that each element of the tensor y is classified into B equal-sized bins. Specifically, the element chw of a quantized tensor $\hat{y}$ may be given by:

$$\hat{y}_{chw} = \frac{1}{2^{B-1}} [2^{B-1} \cdot y_{chw}]$$

where B denotes the number of desired bins. In another instance, the encoder 350 performs a bitplane decomposition operation such that the tensor y may be represented as a binary tensor. Each element of the binary tensor b is a binary expansion of the corresponding element in y into B bits. Thus, each map $y_c \in \mathbb{R}^{H \times W}$ at a particular channel c is expanded into B binary bitplanes. The encoder 350 may perform bitplane decomposition on the quantized tensor $\hat{y}$. The resulting binary tensor b is given by:

$$b = \text{Decompose}(\hat{y}) \in \{0,1\}^{B \times C \times H \times W}$$

The decoder 360 is coupled to receive the tensor y and synthesize the reconstructed content x'. In one embodiment, the decoder 360 also includes a neural network model defined by a series of parameterized functions. Specifically, the reconstructed content x' may be given by:

$$x' = f_r(\hat{y}; \theta_r).$$

where $f_r(\cdot)$ denotes the functions of the decoder 360 associated with a set of parameters $\theta_r$. Collectively combining the operations of the autoencoder 302, the reconstructed content x' corresponding to the content x may be represented as:

$$x' = f_r(f_g(x; \theta_g); \theta_r).$$

During the forward pass step, the decoder 360 receives the set of tensors $y_{i \in S}$ and synthesizes a set of reconstructed content $x'_{i \in S}$ that correspond to the training content $x_{i \in S}$.

The discriminator 304 is coupled to receive input content, and output a discrimination prediction that indicates a likelihood the input content is the original content or the reconstructed version of the content. Specifically, the discriminator 304 is coupled to receive a set of training content and a set of reconstructed content generated by applying the autoencoder 302 to the set of training content. In one instance, original content are assigned a label of 1, while reconstructed content is assigned a label of 0. Thus, the discriminator 304 may predict the input content to be a reconstructed version when the corresponding discrimination prediction is below a threshold value, and may be predict the input content to be the original version when the corresponding prediction is above a threshold value.

The discriminator 304 outputs a discrimination prediction for each content in the set of training content and reconstructed content indicating whether the input content is the original or the reconstructed version. In one embodiment, the discriminator 504 is a neural network model defined by a series of parameterized functions. Specifically, the discrimination prediction generated by applying the discriminator 504 to original content x may be given by:

$$p = f_d(x; \theta_d)$$

where $f_d(\cdot)$ denotes the functions of the discriminator 504 associated with a set of parameters $\theta_d$. Similarly, the discrimination prediction generated by applying the discriminator 504 to corresponding reconstructed content x' may be given by:

$$p' = f_d(x'; \theta_d).$$

During the forward pass step, a set of predictions $p_{i \in S}$ and $p'_{i \in S}$ are generated by applying the discriminator 504 to the set of training content $x_{i \in S}$ and reconstructed content $x'_{i \in S}$, respectively.

Figure 4:
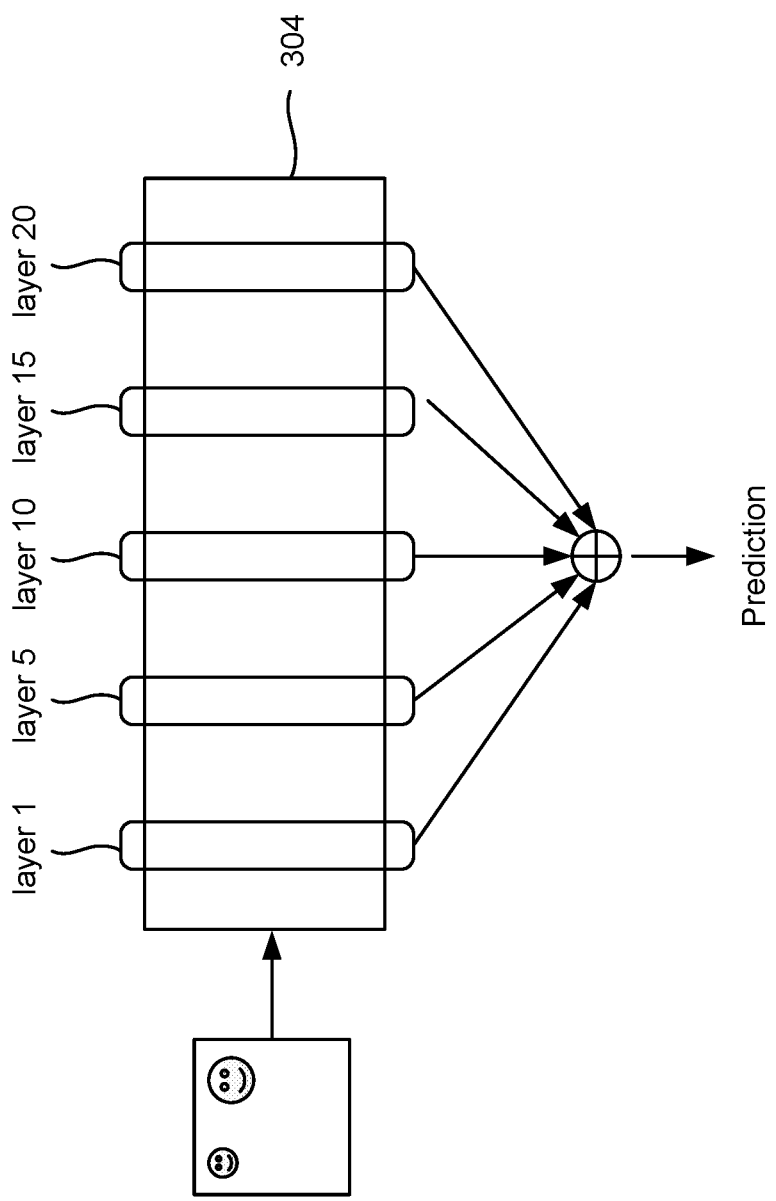
FIG. 4 is an architecture of the discriminator, in accordance with an embodiment.

In one embodiment, the discriminator 304 is further configured to output the discrimination prediction by combining one or more intermediate outputs from the neural network model. FIG. 4 is an architecture of the discriminator 304, in accordance with an embodiment. Specifically, the discrimination prediction p or p' is output by combining the outputs at different depths of the discriminator 304. In one instance, the discrimination prediction is determined by mapping the average of the one or more intermediate outputs to a sigmoid activation function. In the example discriminator 304 shown in FIG. 4, the discrimination prediction for an input content is generated by combining the intermediate outputs at layer 1, layer 5, layer 10, layer 15, and layer 20 of the discriminator 304 neural network model. In this manner, the discrimination prediction is affected by structural features of the input content at different levels of abstraction in the neural network.

The compression system 130 repeatedly alternates between training the autoencoder 302 and the discriminator 304. Specifically, for one or more iterations, a forward pass step and a backpropagation step to update the parameters of the discriminator 304 based on the discriminator loss are repeatedly alternated, while the parameters of the autoencoder 350 are fixed. For one or more subsequent iterations, a forward pass step and a backpropagation step to update the parameters of the autoencoder 302 based on the autoencoder loss function are repeatedly alternated, while the parameters of the discriminator 304 are fixed. The training process is completed when the autoencoder loss function and the discriminator loss satisfies a predetermined criteria.

During the backpropagation step for the discriminator 304, the compression system 130 determines the discriminator loss 334 and repeatedly updates the parameters $\theta_d$ of the discriminator 304 by backpropagating one or more error terms obtained from the discriminator loss 334, while the parameters of the autoencoder 302 are fixed. The error terms are determined based on the negative gradient of the discriminator loss 334 with respect to the parameters $\theta_d$.

In one embodiment, the discriminator loss is given by:

$$\mathcal{L}_d(p_{i \in S}, p'_{i \in S}; \theta_d) = \sum_{i \in S} -\log(f_d(x_i)) - \log(1 - f_d(x'_i))$$

in which the minimum is achieved when the discriminator 304 outputs a 1 for original training content $x_{i \in S}$ and output a 0 for reconstructed content $x'_{i \in S}$. The forward pass and backpropagations steps for the discriminator 504 are repeated for a number of iterations. The subset of training data S may differ from iteration to iteration.

During the backpropagation step for the autoencoder 302, the compression system 130 determines the autoencoder loss function and repeatedly updates the parameters $\theta_a$ of the autoencoder 302, while the parameters of the discriminator 304 are fixed. The error terms are determined based on the negative gradient of the autoencoder loss function with respect to the parameters $\theta_a$. The forward pass and backpropagations steps for the autoencoder 502 are repeated for a number of iterations. The subset of training data S may differ from iteration to iteration.

In one embodiment, the autoencoder loss function may be given by the combination of the reconstruction loss and the negative of the discriminator loss:

$$\mathcal{L}(x_{i \in S}, x'_{i \in S}, p'_{i \in S}; \theta_a) = \mathcal{L}_r(x_{i \in S}, x'_{i \in S}; \theta_a) - \mathcal{L}_d(p_{i \in S}, p'_{i \in S}; \theta_d)$$

where $L_r$ indicates the reconstruction loss, and $\theta_a$ indicates the parameters of the autoencoder 202. The compression system 130 determines the reconstruction loss 330 along with the discriminator loss 334 during the backpropagation step.

In one embodiment, the reconstruction loss 330 is given by:

$$\mathcal{L}_r(x_{i \in S}, x'_{i \in S}; \theta_a) = \sum_{i \in S} \|x_i - x'_i\|^2$$

that indicates a pixel-by-pixel difference between the training content $x_{i \in S}$ and the reconstructed content $x'_{i \in S}$.

In another embodiment, the autoencoder loss function additionally includes the codelength regularization loss $$\mathcal{L}(x_{i \in S}, x'_{i \in S}, p_{i \in S}; \theta_a) = \mathcal{L}_r(x_{i \in S}, x'_{i \in S}; \theta_a) + \mathcal{L}_{cl}(\hat{y}_{i \in S}; \alpha) - \mathcal{L}_d(p_{i \in S}, p'_{i \in S}; \theta_d)$$

where $L_{cl}$ indicates the codelength regularization loss. The compression system 130 determines the codelength regularization loss 338 along with the reconstruction loss 330 and the discriminator loss 334 during the backpropagation step.

In one embodiment, the codelength regularization loss 338 is given by:

$$\mathcal{L}_{cl}(\hat{y}_{i \in S}; \alpha) = \sum_{i \in S} \left[ \frac{\alpha_t}{CHW} \cdot \sum_{chw} \left[ \log_2 |\hat{y}_{i,chw}| + \sum_{(x,y) \in U} \log_2 |\hat{y}_{i,chw} - \hat{y}_{i,(h-y)(w-x)}| \right] \right]$$

where U is the set $\{(0, 1), (1, 0), (1, 1), (-1, 1)\}$, at is a weight, and $\hat{y}_{i,chw}$ denotes element chw of the quantized set of tensors for the training content. The compression system 130 may adjust the weight $\alpha_t$ of the codelength regularization loss 338 according to the length of the compressed code 382 generated by applying the entropy coder 380 to the set of quantized tensors $\hat{y}_{i \in S}$. Specifically, the compression system 130 increases the weight $\alpha_t$ if the length of the compressed codes 382 is above a target length, and decreases the weight $\alpha_t$ if the length is below a target length. The compression system 130 may adjust the weight $\alpha_t$ at each backpropagation step. In this manner, parameters of the autoencoder 302 are trained to generate tensors that exploit relatively simple structures of the content when possible.

In one embodiment, the compression system 130 modulates the error terms arising from the reconstruction loss $L_r$ and the discriminator loss $L_d$ when the parameters of the autoencoder 302 are updated by backpropagating the error terms from the autoencoder loss function. For example, the compression system 130 may modulate the magnitude of the gradient arising from the reconstruction loss $\nabla L_r(\theta_a)$ and the magnitude of the gradient arising from the discriminator loss $\nabla L_d(\theta_a)$ when updating the parameters of the autoencoder 302 to balance these two objectives.

In one embodiment, the compression system 130 performs the training process for the autoencoder 302 and the discriminator 304 based on the prediction accuracy of the discriminator 304 during the forward pass steps. Specifically, when the prediction accuracy of the discriminator 304 is below a threshold L, the compression system 130 continuously trains the discriminator 304 by repeating the forward pass and backpropagation steps for the discriminator 304, while the parameters for the autoencoder 302 are fixed. When the prediction accuracy of the discriminator 304 is above a threshold U, the compression system 130 continuously trains the autoencoder 302 by repeating the forward pass and backpropagation steps for the autoencoder 302, while the parameters for the discriminator 304 are fixed. When the prediction accuracy of the discriminator 304 is between L and U, the compression system 1F30 alternates between training the autoencoder 302 and the discriminator 304 at each iteration.

Figure 5:
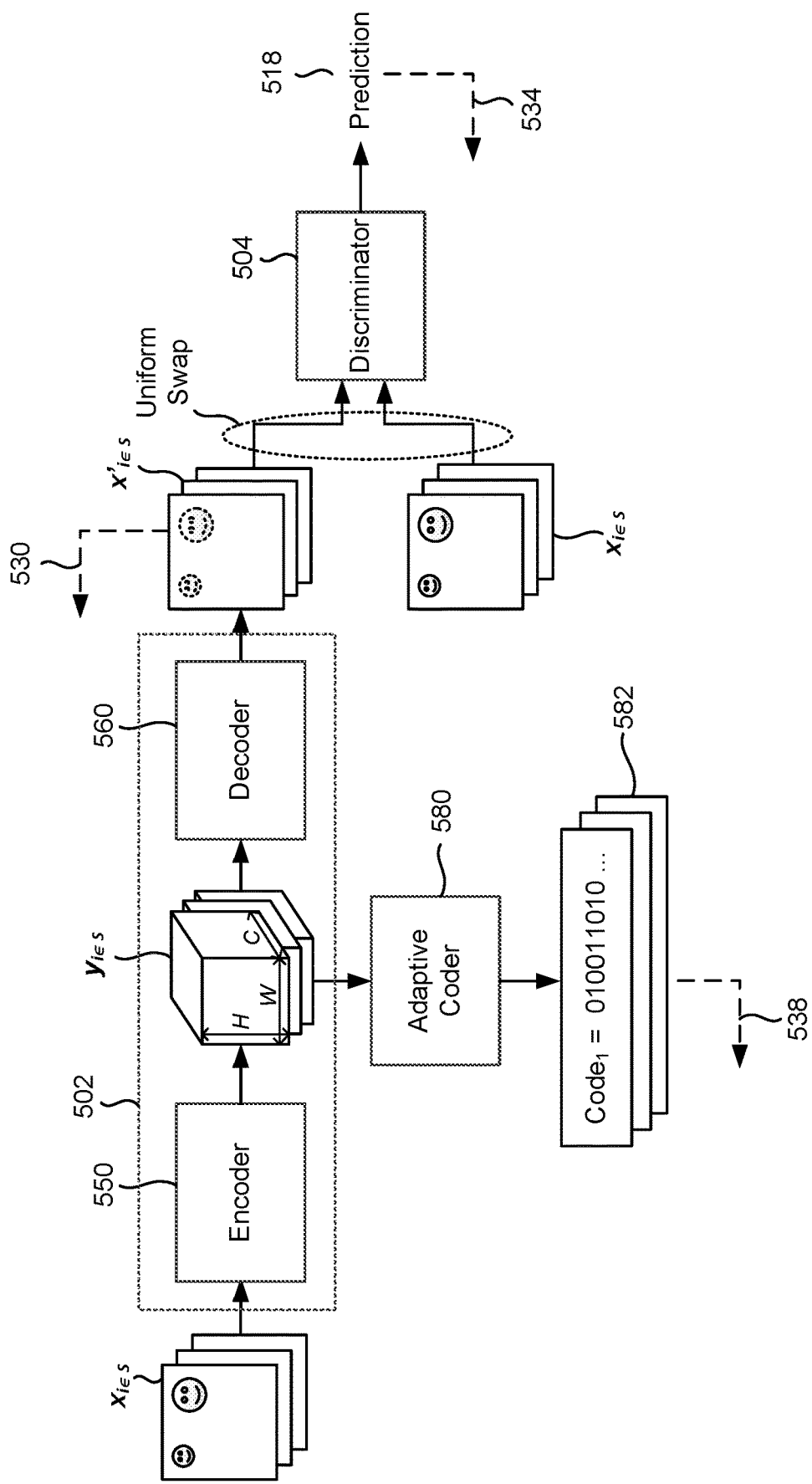
FIG. 5 illustrates a detailed process of training the autoencoder with the discriminator, in accordance with another embodiment.

FIG. 5 illustrates a detailed process of training the autoencoder 502 with the discriminator 504, in accordance with another embodiment. The discriminator 504 in FIG. 5 is coupled to receive a pair of training content and reconstructed content output by the autoencoder 502, and output a discrimination prediction.

The discriminator 504 is coupled to receive an ordered pair of input content including a first content and a second content, and output a discrimination prediction that indicates which in the pair is the original version. Specifically, the discriminator 504 is coupled to receive pairs of training content and corresponding reconstructed content generated by applying the autoencoder 502 to the training content. In one embodiment, the compression system 130 uniformly swamps the order of the pair before the pair is input to the discriminator 504. In one instance, an ordered pair in which the reconstructed content is the first element and the original content is the second element is assigned a label of 0, while the reverse is assigned a label of 1. The discriminator 504 may predict that the first content in the pair is the reconstructed content when the discrimination prediction is below a threshold, and may predict that the first content in the pair is the original content when the discrimination prediction is above a threshold.

In one embodiment, the discriminator 504 is also a neural network model defined by a series of parameterized functions. Specifically, the discrimination prediction generated by applying the discriminator 504 to a pair of training content x and corresponding reconstructed content x' may be given by:

$$p = f_d(r(x', x); \theta_d)$$

where $r(\cdot)$ denotes a random swap of the pair with uniform probability. During the forward pass step, a set of predictions $p_{i \in S}$ are generated by applying the discriminator 504 to the pair of training content and reconstructed content $r(x'_i, x_i)_{i \in S}$ randomly swamped at a uniform probability. Similarly to the embodiment shown in FIG. 4, the discriminator 504 may also be configured to output the discrimination prediction p based on one or more intermediate outputs of the discriminator 504.

During the backpropagation step for the discriminator 504, the compression system 130 determines the discriminator loss 534 and repeatedly updates the parameters $\theta_d$ of the discriminator 304 by backpropagating one or more error terms obtained from the discriminator loss 534, while the parameters of the autoencoder 302 are fixed. The error terms are determined based on the negative gradient of the discriminator loss 334 with respect to the parameters $\theta_d$.

In one embodiment, the discriminator loss is given by:

$$\mathcal{L}_d(p_{i \in S}; \theta_d) = \sum_{i \in S'} -\log(f_d(x_i, x'_i)) + \sum_{i \in S''} -\log(1 - f_d(x'_i, x_i))$$

where S' denotes the subset of training data in which the training content $x_i$ is the first element of the pair, and S" denotes the subset of training data in which the reconstructed content $x'_i$ is the first element of the pair after the random swamp. The minimum is achieved when the discriminator 504 outputs a 1 for a pair containing training content $x_i$ as the first element, and outputs a 0 for a pair containing the reconstructed content $x'_i$ as the first element. The forward pass and backpropagations steps for the discriminator 504 are repeated for a number of iterations. The subset of training data S may differ from iteration to iteration.

During the backpropagation step for the autoencoder 502, the compression system 130 determines the autoencoder loss function and repeatedly updates the parameters $\theta_a$ of the autoencoder 502. Specifically, the autoencoder loss function may be given by the combination of the reconstruction loss and the negative of the discriminator loss:

$$\mathcal{L}(x_{i \in S}, x'_{i \in S}, p_{i \in S}; \theta_a) = \mathcal{L}_r(x_{i \in S}; x'_{i \in S}; \theta_a) - \mathcal{L}_d(p_{i \in S}; \theta_d)$$

in which the discriminator loss $L_d$ is now determined based on the pair of training and reconstructed content. The compression system 130 may determine the reconstruction loss 530 and the discriminator loss 534 during the backpropagation step. The autoencoder loss function may also include the codelength regularization loss:

$$\mathcal{L}(x_{i \in S}; x'_{i \in S}; \theta_a) = \mathcal{L}_r(x_{i \in S}; x'_{i \in S}; \theta_a) + \mathcal{L}_{cl}(\hat{y}x_{i \in S}; \alpha) - \mathcal{L}_d(p_{i \in S}; \theta_d).$$

The compression system 130 may determine the codelength regularization loss 538 in addition to the reconstruction loss 530 and the discriminator loss 534.

Similarly to the autoencoder 302 shown in FIG. 3, the compression system 130 may modulate error terms arising from the reconstruction loss $L_r$ and the discriminator loss $L_d$ when the parameters of the autoencoder 502 are updated by backpropagating the error terms from the autoencoder loss function. Also similarly to the autoencoder 302 shown in FIG. 3, the compression system 130 may alternate between the training process for the autoencoder 502 and the discriminator 504 based on the prediction accuracy of the discriminator 504 during the forward pass steps.

Deployment Process of Encoder and Decoder

Figure 6:
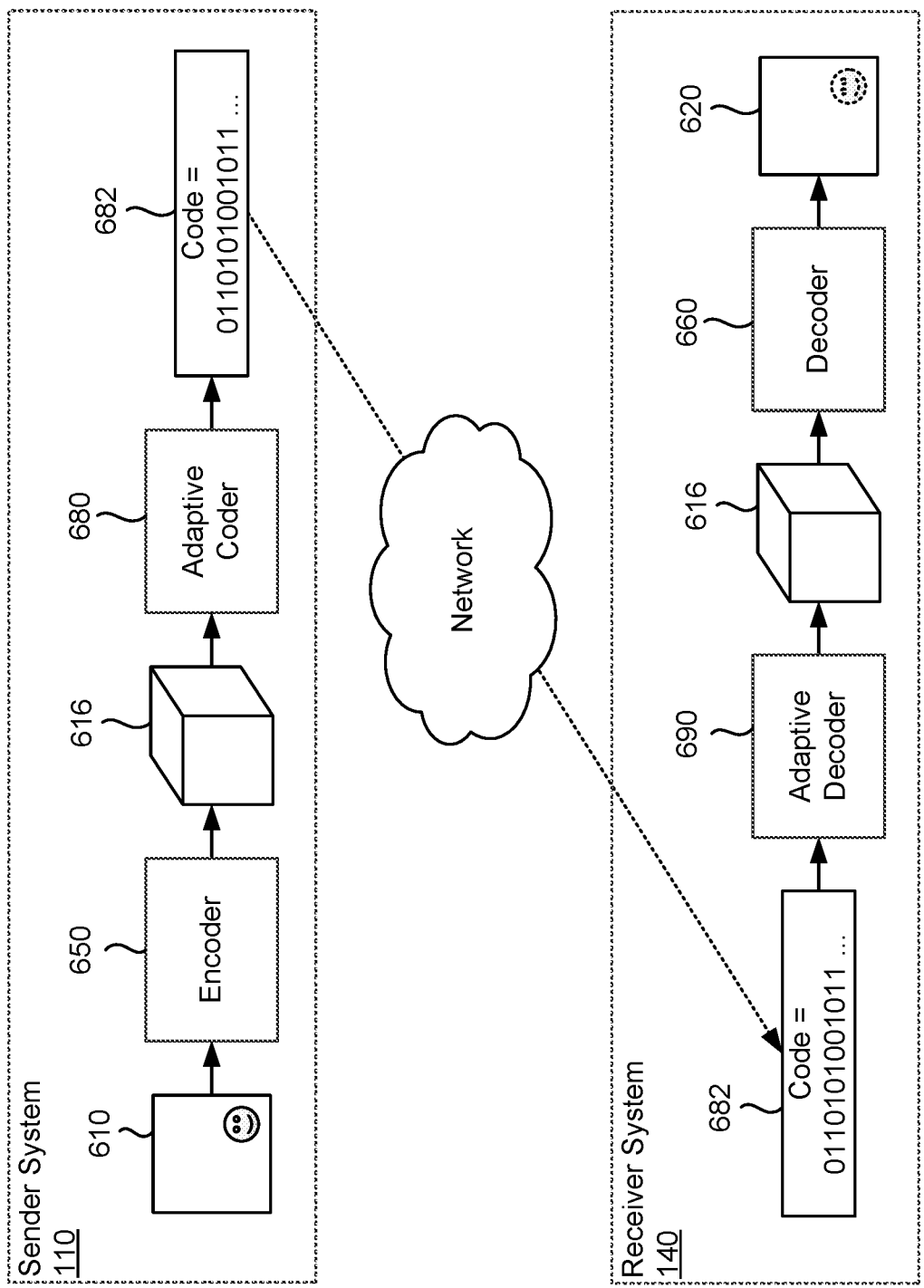
FIG. 6 illustrates a deployment process for a machine-learned encoder and the machine-learned decoder, in accordance with an embodiment.

FIG. 6 illustrates a deployment process for a machine-learned encoder 650 and the machine-learned decoder 660, in accordance with an embodiment. After the training process for the autoencoder and the discriminator have been completed, the sender system 110 receives encoding components including the encoder 650 and the entropy coder 680 from the compression system 130. The receiver system 140 receives decoding components including the decoder 660 and the entropy decoder 690 from the compression system 130. The discriminator is not required for the deployment process, and may not be included in the encoding components.

The sender system 110 applies the encoding components to encode content for transmission to the receiver system 140. Specifically, the sender system 110 generates a tensor for the content to be transmitted by applying the encoder 650 to the content, and generates a compressed code for the content by applying the entropy coder 680 to the tensor. The sender system 110 may then transmit the compressed code to the receiver system 140. In the example shown in FIG. 4, the sender system 110 applies the encoder 650 to content 610 to generate a tensor 616 for the content 610. The sender system 110 applies the entropy coder 680 to the tensor 616 to generate the compressed code 682 for the content 610. The compressed code 682 is transmitted to the receiver system 140.

The receiver system 140 applies the decoding components to synthesize the reconstructed content from the compressed code. Specifically, the receiver system 140 synthesizes a tensor by applying the entropy decoder 690 to the compressed code, and generates the reconstructed content by applying the machine-learned decoder 660 to the synthesized tensor. In the example shown in FIG. 4, the receiver system 140 applies the entropy decoder 690 to the compressed code 682 to synthesize the tensor 616. The receiver system 140 applies the decoder 660 to the tensor 616 to generate the reconstructed content 620.

Multi-Scale Training of Autoencoder and Discriminator

In one embodiment, the compression system 130 trains a series of autoencoders and discriminators coupled to receive content across one or more different scales of the content. Specifically, the compression system 130 trains a set of autoencoder and discriminator pairs, in which the k-th autoencoder and discriminator in the pair are coupled to receive content at a corresponding scale $s_k$. The k-th autoencoder is coupled to receive training content at scale $s_k$ and output reconstructed content at scale $s_k$. The k-th discriminator is coupled to receive the training content and the reconstructed content output by the autoencoder and output discrimination predictions. The reconstructed content at each scale $s_k$ is combined to generate the final reconstructed content. By training autoencoder and discriminator pairs across different scales, each autoencoder can address compression artifacts that arise at different scales of content.

The k-th autoencoder and discriminator pair may be coupled together as shown in the embodiments of FIG. 3 or FIG. 5. The compression system 130 trains the k-th autoencoder to reduce an autoencoder loss function that includes the reconstruction loss and the negative of the discriminator loss. The reconstruction loss is determined based on a dissimilarity between the final reconstructed content and the training content. The discriminator loss is determined based on the discrimination predictions output by the k-th discriminator. The autoencoder loss function may optionally include the codelength regularization loss determined based on the tensor generated by the k-th autoencoder. The compression system 130 trains the k-th discriminator to reduce the discriminator loss.

For each pair, the compression system 130 may repeatedly alternate between performing one or more iterations of forward pass and backpropagation steps for the discriminator, and performing one or more iterations of forward pass and backpropagation steps for the autoencoder. During the forward pass step, a set of scaled training content $x^k_{i \in S}$, k=1, 2, . . . , K is generated by downsampling the original training content $x_{i \in S}$ into K different scales. The set of reconstructed content $x'^k_{i \in S}$, k=1, 2, . . . , K is generated for each scale $s_k$ by applying the k-th autoencoder to the corresponding training content $x^k_{i \in S}$. The discrimination predictions $p^k_{i \in S}$ are also generated by applying the k-th discriminator to the training content $x^k_{i \in S}$ and reconstructed content $x'^k_{i \in S}$ associated with the scale. The final reconstructed content $x'_{i \in S}$ is generated by combining the reconstructed content x' is at each scale.

Figure 7:
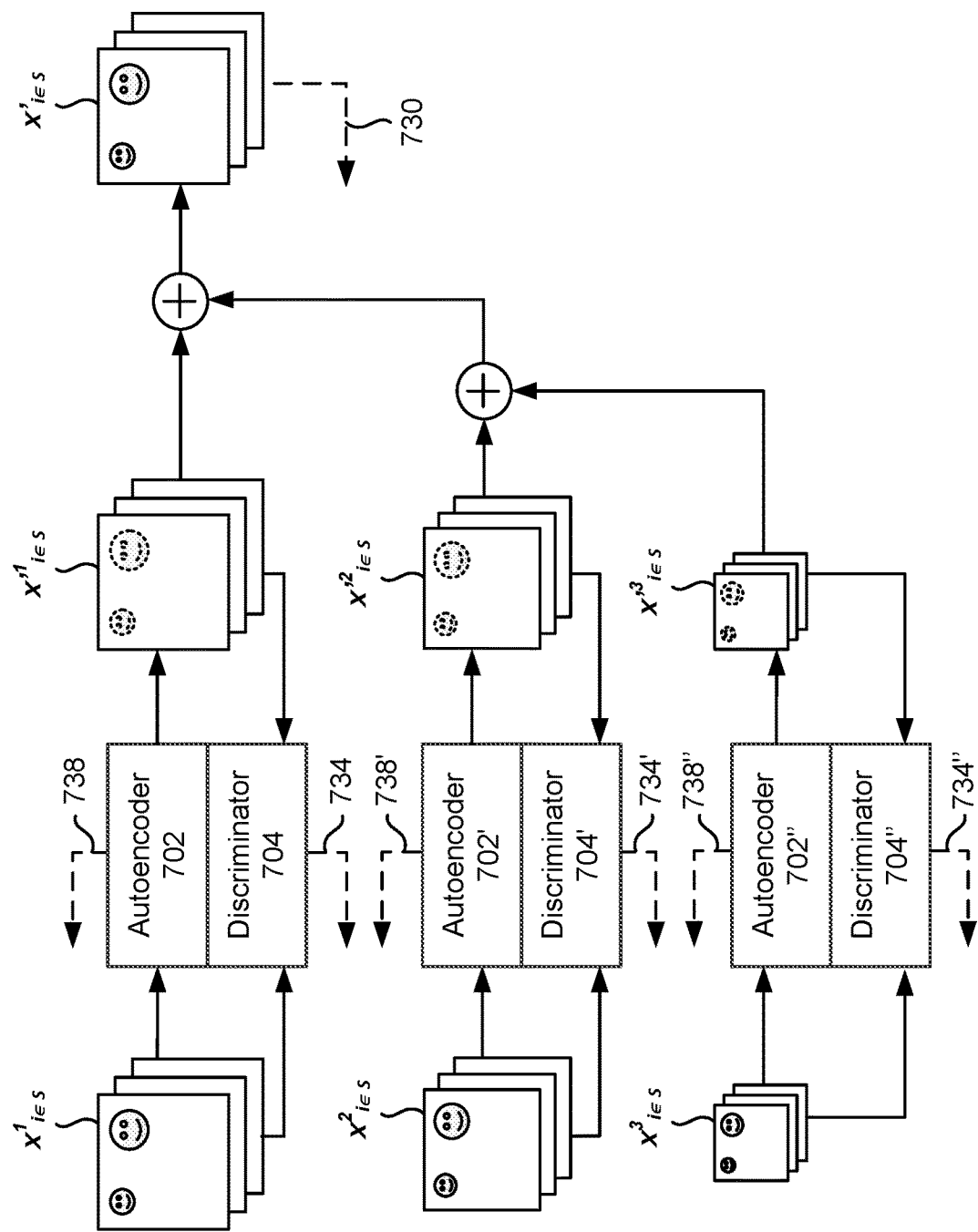
FIG. 7 illustrates an example process for training a set of multi-scale autoencoders with a set of multi-scale discriminators, in accordance with an embodiment.

FIG. 7 illustrates an example process for training a set of multi-scale autoencoders with a set of multi-scale discriminators, in accordance with an embodiment. Specifically, FIG. 7 shows a set of K=3 autoencoder and discriminator pairs. The first pair includes autoencoder 702 coupled to discriminator 704 that are configured to receive content associated with the original scale $s_1$. The second pair includes autoencoder 702' coupled to discriminator 704' that are associated with scale $s_2$ smaller than scale $s_1$. The last pair includes autoencoder 702" coupled to discriminator 704" that are associated with scale $s_3$ smaller than scale $s_2$.

During the forward pass step, the set of scaled training content $x^1_{i \in S}$, $x^2_{i \in S}$, $x^3_{i \in S}$ are generated. Specifically, $x^2_{i \in S}$ is generated by downsampling the original content $x^1_{i \in S}$, and $x^3_{i \in S}$ is generated by downsampling the scaled content $x^2_{i \in S}$. The reconstructed content $x'^1_{i \in S}$ for scale $s_1$ is generated by applying autoencoder 702 to the scaled content $x^1_{i \in S}$, reconstructed content $x'^2_{i \in S}$ for scale $s_2$ is generated by applying autoencoder 702' to the scaled content $x^2_{i \in S}$, and the reconstructed content $x'^3_{i \in S}$ for scale $s_3$ is generated by applying autoencoder 702" to the scaled content $x^3_{i \in S}$. A set of discrimination predictions $p^1_{i \in S}$, $p^2_{i \in S}$, $p^3_{i \in S}$ are also generated during the same forward pass step. Specifically, $p^1_{i \in S}$ is generated by applying the discriminator 704 to $x^1_{i \in S}$ and $x'^1_{i \in S}$, $p^2_{i \in S}$ is generated by applying the discriminator 704' to $x^2_{i \in S}$ and $x'^2_{i \in S}$, and $p^3_{i \in S}$ is generated by applying the discriminator 704" to $x^3_{i \in S}$ and $x'^3_{i \in S}$. The set of reconstructed content $x^1_{i \in S}$, $x^2_{i \in S}$, $x^3_{i \in S}$ are combined to output the final reconstructed content $x'_{i \in S}$.

During the backpropagation step for the discriminators, the compression system 130 determines the discriminator loss associated with the k-th discriminator, and repeatedly updates the parameters of the k-th discriminator based on the error terms obtained from the corresponding discriminator loss. During the backpropagation step for the autoencoder, the compression system 130 determines the autoencoder loss function associated with the k-th autoencoder, and repeatedly updates the parameters of the k-th autoencoder based on the error terms obtained from the corresponding autoencoder loss function.

In the example shown in FIG. 7, the compression system 130 determines the discriminator loss 734, 734', 734" for discriminators 704, 704', 704" respectively during the backpropagation steps for the discriminators. The compression system 130 repeatedly updates the parameters for discriminator 704 based on error terms obtained from discriminator loss 734, while parameters of the autoencoder 702 are fixed. Similarly, the compression system 130 repeatedly updates the parameters for discriminator 704' based on discriminator loss 734', and repeatedly updates the parameters for discriminator 704" based on discriminator loss 734".

The compression system 130 determines the autoencoder loss function for autoencoders 702, 702', 702" during the backpropagation steps for the autoencoders. The autoencoder loss function for autoencoder 702 may include the reconstruction loss 730, negative of the discriminator loss 734, and optionally the codelength regularization loss 738. Similarly, the autoencoder loss function for autoencoder 702' may include the reconstruction loss 730, negative of the discriminator loss 734', and optionally the codelength regularization loss 738', and the autoencoder loss function for autoencoder 702" may include the reconstruction loss 730, negative of the discriminator loss 734", and optionally the codelength regularization loss 738". The compression system 130 repeatedly updates the parameters for the autoencoders 702, 702', 702" based on error terms obtained from the corresponding autoencoder loss functions.

When the training process is completed, the compression system 130 provides the sender system 110 with encoding components including the encoder and entropy coder for each scale $s_k$, and provides the receiver system 140 with decoding components including the decoder and entropy decoder for each scale $s_k$. In the example shown in FIG. 7, the compression system 130 may provide the sender system 110 with the encoders and entropy coders associated with autoencoders 702, 702', and 702", and may provide the receiver system 140 with the decoders and entropy decoders associated with autoencoders 702, 702', and 702" after training process has been completed.

During deployment, the sender system 110 applies the encoding components at each scale $s_k$ to generate a set of K compressed codes. The sender system 110 transmits the set of compressed codes to the receiver system 140. The receiver system 140 sequentially applies the decoding components to the set of compressed codes to generate a set of reconstructed content at each scale $s_k$. The receiver system 140 generates the final reconstructed content by combining the reconstructed content at each scale $s_k$.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for training an encoder and a decoder, the method comprising:
    obtaining a set of training content; and
    for a compression model including an encoding portion, a decoding portion, and a discriminator portion:
        repeatedly backpropagating one or more error terms obtained from a loss function to update a set of parameters of the encoding portion and the decoding portion, wherein the loss function includes:
            a reconstruction loss indicating a dissimilarity between the training content and reconstructed content, wherein the reconstructed content is generated by applying the encoding portion to the training content to generate tensors for the training content, and applying the decoding portion to the tensors to generate the reconstructed content, and
            a discriminator loss indicating a cost of generating incorrect discrimination predictions generated by applying the discriminator portion to input content, wherein the discriminator portion is coupled to receive at least ordered pairs of the training content and the corresponding reconstructed content as the input content, and wherein the discrimination predictions indicate which content in the ordered pairs is the reconstructed version of the training content; and
        stopping the backpropagation after the loss function satisfies a predetermined criteria.

2. The method of claim 1, wherein the ordered pairs of input content include a first pair having first training content as a first element and first reconstructed content as a second element, and a second pair having second reconstructed content as the first element and second training content as the second element.

3. The method of claim 1, wherein the discriminator portion includes a neural network model, and the discrimination predictions are generated by combining outputs from one or more intermediate layers of the neural network model.

4. The method of claim 1, wherein the loss function further includes:
a codelength regularization loss indicating a cost of code lengths for compressed codes generated by applying an entropy coding technique to the tensors, wherein the codelength regularization loss is determined based on magnitudes of elements of the tensors for the training content.

5. The method of claim 1, further comprising:
repeatedly backpropagating one or more error terms obtained from the discriminator loss to update a set of parameters of the discriminator portion while fixing the set of parameters of the encoding portion and the decoding portion; and
stopping the backpropagation after the discriminator loss satisfies a predetermined criteria.

6. The method of claim 5, further comprising:
responsive to determining that an accuracy of the discrimination predictions are above a first threshold, repeatedly backpropagating the error terms obtained from the loss function to update the set of parameters of the encoding portion and the decoding portion for one or more iterations,
responsive to determining that the accuracy of the discrimination predictions are below a second threshold, repeatedly backpropagating the error terms obtained from the discriminator loss to update the set of parameters of the discriminator portion for one or more iterations, and
responsive to determining that the accuracy of the discrimination predictions are between the first threshold and the second threshold, alternating between backpropagating the error terms obtained from the loss function to update the set of parameters of the encoding portion and the decoding portion and backpropagating the error terms obtained from the discriminator loss to update the set of parameters of the discriminator portion.

7. A decoder stored on a computer readable storage medium, wherein the decoder is manufactured by a process comprising:
obtaining a set of training content;
for a compression model including an encoding portion, a decoding portion, and a discriminator portion,
repeatedly backpropagating one or more error terms obtained from a loss function to update a set of parameters of the encoding portion and the decoding portion, wherein the loss function includes:
a reconstruction loss indicating a dissimilarity between the training content and reconstructed content, wherein the reconstructed content is generated by applying the encoding portion to the training content to generate tensors for the training content, and applying the decoding portion to the tensors to generate the reconstructed content, and
a discriminator loss indicating a cost of generating incorrect discrimination predictions generated by applying the discriminator portion to input content, wherein the discriminator portion is coupled to receive at least ordered pairs of the training content and the corresponding reconstructed content as the input content, and wherein the discrimination predictions indicate which content in the ordered pairs is the reconstructed version of the training content; and
stopping the backpropagation after the loss function satisfies a predetermined criteria; and
storing the set of parameters of the decoding portion on the computer readable storage medium as the parameters of the decoder, wherein the decoder is coupled to receive a compressed code for content and output a reconstructed version of the content using the stored parameters.

8. The decoder of claim 7, wherein the ordered pairs of input content include a first pair having first training content as a first element and first reconstructed content as a second element, and a second pair having second reconstructed content as the first element and second training content as the second element.

9. The decoder of claim 7, wherein the discriminator portion includes a neural network model, and the discrimination predictions are generated by combining outputs from one or more intermediate layers of the neural network model.

10. The decoder of claim 7, wherein the loss function further includes:
a codelength regularization loss indicating a cost of code lengths for compressed codes generated by applying an entropy coding technique to the tensors, wherein the codelength regularization loss is determined based on magnitudes of elements of the tensors for the training content.

11. The decoder of claim 7, further comprising:
repeatedly backpropagating one or more error terms obtained from the discriminator loss to update a set of parameters of the discriminator portion while fixing the set of parameters of the encoding portion and the decoding portion; and
stopping the backpropagation after the discriminator loss satisfies a predetermined criteria.

12. The decoder of claim 11, further comprising:
responsive to determining that an accuracy of the discrimination predictions are above a first threshold, repeatedly backpropagating the error terms obtained from the loss function to update the set of parameters of the encoding portion and the decoding portion for one or more iterations,
responsive to determining that the accuracy of the discrimination predictions are below a second threshold, repeatedly backpropagating the error terms obtained from the discriminator loss to update the set of parameters of the discriminator portion for one or more iterations, and
responsive to determining that the accuracy of the discrimination predictions are between the first threshold and the second threshold, alternating between backpropagating the error terms obtained from the loss function to update the set of parameters of the encoding portion and the decoding portion and backpropagating the error terms obtained from the discriminator loss to update the set of parameters of the discriminator portion.

13. An encoder stored on a computer readable storage medium, wherein the encoder is manufactured by a process comprising:

obtaining a set of training content;

for a compression model including an encoding portion, a decoding portion, and a discriminator portion, repeatedly backpropagating one or more error terms obtained from a loss function to update a set of parameters of the encoding portion and the decoding portion, wherein the loss function includes:

a reconstruction loss indicating a dissimilarity between the training content and reconstructed content, wherein the reconstructed content is generated by applying the encoding portion to the training content to generate tensors for the training content, and applying the decoding portion to the tensors to generate the reconstructed content, and a discriminator loss indicating a cost of generating incorrect discrimination predictions generated by applying the discriminator portion to input content, wherein the discriminator portion is coupled to receive at least ordered pairs of the training content and the corresponding reconstructed content as the input content, and wherein the discrimination predictions indicate which content in the ordered pairs is the reconstructed version of the training content; and stopping the backpropagation after the loss function satisfies a predetermined criteria; and storing the set of parameters of the encoding portion on the computer readable storage medium as the parameters of the encoder, wherein the decoder is coupled to receive content and output a compressed code for the content using the stored parameters.

14. The encoder of claim 13, wherein the ordered pairs of input content include a first pair having first training content as a first element and first reconstructed content as a second element, and a second pair having second reconstructed content as the first element and second training content as the second element.

15. The encoder of claim 13, wherein the discriminator portion includes a neural network model, and the discrimination predictions are generated by combining outputs from one or more intermediate layers of the neural network model.

16. The encoder of claim 13, wherein the loss function further includes:

a codelength regularization loss indicating a cost of code lengths for compressed codes generated by applying an entropy coding technique to the tensors, wherein the codelength regularization loss is determined based on magnitudes of elements of the tensors for the training content.

17. The encoder of claim 13, further comprising:

repeatedly backpropagating one or more error terms obtained from the discriminator loss to update a set of parameters of the discriminator portion while fixing the set of parameters of the encoding portion and the decoding portion; and stopping the backpropagation after the discriminator loss satisfies a predetermined criteria.

18. The encoder of claim 17, further comprising:

responsive to determining that an accuracy of the discrimination predictions are above a first threshold, repeatedly backpropagating the error terms obtained from the loss function to update the set of parameters of the encoding portion and the decoding portion for one or more iterations, responsive to determining that the accuracy of the discrimination predictions are below a second threshold, repeatedly backpropagating the error terms obtained from the discriminator loss to update the set of parameters of the discriminator portion for one or more iterations, and responsive to determining that the accuracy of the discrimination predictions are between the first threshold and the second threshold, alternating between backpropagating the error terms obtained from the loss function to update the set of parameters of the encoding portion and the decoding portion and backpropagating the error terms obtained from the discriminator loss to update the set of parameters of the discriminator portion.

19. A method for training an encoder and a decoder, comprising:

obtaining training content and downsampling the training content to generate a set of training content each associated with a corresponding scale in a set of scales; and for a compression model including a set of autoencoder and discriminator pairs:

for each autoencoder and discriminator pair associated with a corresponding scale, repeatedly backpropagating one or more error terms obtained from a loss function to update a set of parameters of the autoencoder in the pair, wherein the loss function includes:

a reconstruction loss indicating a dissimilarity between the training content and reconstructed content, wherein the reconstructed content is generated by combining a set of content generated by applying the autoencoders of the set of pairs to the corresponding set of training content, and a discriminator loss indicating a cost of incorrect discrimination predictions generated by applying the discriminator of the pair to input content, wherein the discriminator of the pair is coupled to receive at least ordered pairs of the training content associated with the scale and content generated by applying the autoencoder of the pair to the training content associated with the scale as the input content, and wherein the discrimination predictions indicate which content in the ordered pairs is the reconstructed version of the training content; and stopping the backpropagation after the loss function satisfies a predetermined criteria.

* * * * *